(12) United States Patent
Jensen

(10) Patent No.: US 11,705,764 B2
(45) Date of Patent: Jul. 18, 2023

(54) SEGMENTED STATOR FOR A GENERATOR, IN PARTICULAR FOR A WIND TURBINE

(71) Applicant: Siemens Gamesa Renewable Energy A/S, Brande (DK)

(72) Inventor: Thomas Toettrup Jensen, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 57 days.

(21) Appl. No.: 16/989,166

(22) Filed: Aug. 10, 2020

(65) Prior Publication Data

US 2021/0050751 A1 Feb. 18, 2021

(30) Foreign Application Priority Data

Aug. 14, 2019 (EP) .................................... 19191656

(51) Int. Cl.
*H02K 1/14* (2006.01)
*H02K 7/18* (2006.01)
(Continued)

(52) U.S. Cl.
CPC .............. *H02K 1/148* (2013.01); *H02K 1/16* (2013.01); *H02K 7/1838* (2013.01); *H02K 15/0025* (2013.01); *F03D 9/25* (2016.05)

(58) Field of Classification Search
CPC ........ H02K 15/0025; H02K 1/06; H02K 1/16; H02K 1/165; H02K 1/141; H02K 1/148;
(Continued)

(56) References Cited

U.S. PATENT DOCUMENTS

| | | | | |
|---|---|---|---|---|
| 5,485,050 A | * | 1/1996 | Zimmermann | ........ H02K 3/505 310/260 |
| 2004/0104638 A1 | * | 6/2004 | Yoneda | .................. H02K 1/148 310/216.012 |

(Continued)

FOREIGN PATENT DOCUMENTS

| | | | | |
|---|---|---|---|---|
| JP | S60102828 A | | 6/1985 | |
| JP | 2018074689 A | * | 5/2018 | ............... H02K 1/16 |

(Continued)

OTHER PUBLICATIONS

Machine Translation of JP 2018074689 A (Year: 2018).*
European Search Report dated Jan. 27, 2020 for Application No. 19191656.8.

*Primary Examiner* — Michael Andrews
(74) *Attorney, Agent, or Firm* — Schmeiser, Olsen & Watts LLP

(57) ABSTRACT

A segmented stator for a generator, for a wind turbine is provided. The stator includes a plurality of teeth and slots for coil windings, wherein the teeth extend from a yoke of the stator in a radial direction of the stator. The stator includes at least a first stator segment having a first end-surface in a circumferential direction of the stator and a second stator segment having a second end-surface in the circumferential direction of the stator, wherein the first and second end-surfaces are arranged adjacent to each other to form the stator. The first end-surface includes first protrusions protruding the circumferential direction of the stator and first recesses therebetween, the first protrusions forming first teeth extending from the yoke of the stator in the radial direction of the stator.

6 Claims, 3 Drawing Sheets

Figure 1:
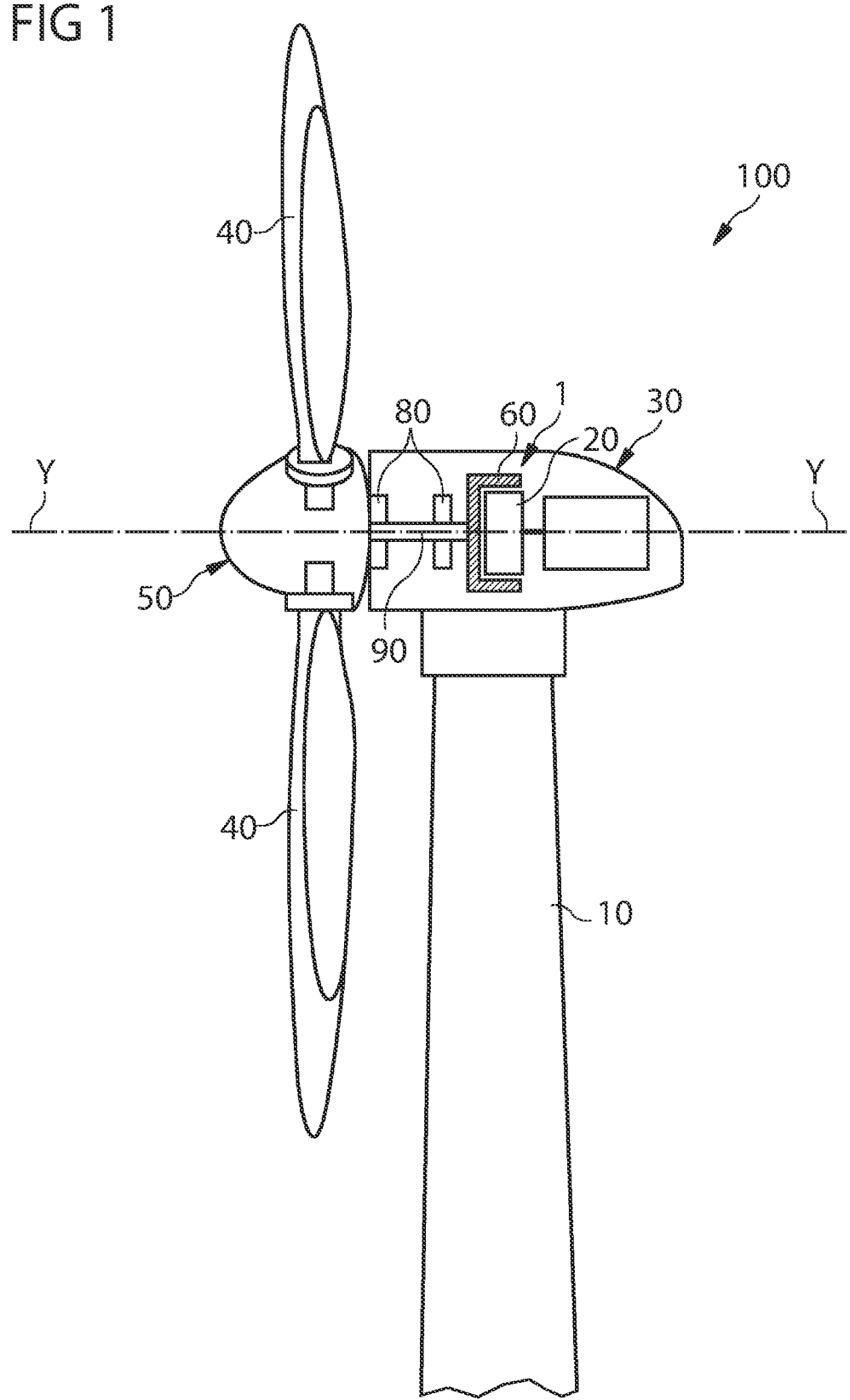

(51) Int. Cl.
    *H02K 1/16*     (2006.01)
    *H02K 15/00*     (2006.01)
    *F03D 9/25*     (2016.01)

(58) Field of Classification Search
    CPC ........ H02K 7/18; H02K 7/1838; H02K 1/143;
               H02K 7/183; F03D 9/25; F03D 9/20
    USPC ............ 310/179, 216.008, 216.009, 216.011
    See application file for complete search history.

(56) References Cited

U.S. PATENT DOCUMENTS

| | | |
|---|---|---|
| 2006/0097584 A1 | 5/2006 | Morel |
| 2011/0266807 A1 * | 11/2011 | Haran .................... H02K 1/185 |
| | | 290/55 |
| 2012/0299434 A1 * | 11/2012 | Hartmann ............. H02K 1/148 |
| | | 310/216.074 |
| 2014/0091673 A1 * | 4/2014 | Anbarasu ............... H02K 15/08 |
| | | 310/216.109 |
| 2019/0058380 A1 | 2/2019 | Samanta |
| 2021/0119498 A1 | 4/2021 | Sato et al. |

FOREIGN PATENT DOCUMENTS

| | | | |
|---|---|---|---|
| WO | 2019111777 A1 | 6/2019 | |
| WO | WO-2019116389 A1 * | 6/2019 | ............... H01K 1/00 |

\* cited by examiner

SEGMENTED STATOR FOR A GENERATOR, IN PARTICULAR FOR A WIND TURBINE

CROSS-REFERENCE TO RELATED APPLICATIONS

This application claims priority to EP Application No. 19191656.8, having a filing date of Aug. 14, 2019, the entire contents of which are hereby incorporated by reference.

FIELD OF TECHNOLOGY

The following relates to a segmented stator for a generator, in particular for a wind turbine. The wind turbine can be a direct drive wind turbine, i.e. there is no gearbox between a hub and a generator, wherein an electrical generator thereof comprises such a segmented stator. The following also relates to a generator, in particular for a wind turbine, comprising the stator; a wind turbine comprising the generator; a stator segment configured to be used in the stator; and a method of manufacturing the segmented stator.

BACKGROUND

An electrical generator, such as an electric generator in-stalled in a wind turbine, typically comprises a rotor which rotates relative to a stator.

The stator normally comprises a frame body longitudinally extending along a longitudinal axis and including a stator yoke and a plurality of teeth protruding according to a radial direction from the stator yoke. In the stator, a plurality of slots is also defined, each slot typically being delimited circumferentially by two adjacent teeth and radially extending between the stator yoke and respective teeth radial ends. Each slot houses parts of at least one coil winding.

In this technical field, it is further known to build direct drive electrical generators, in particular large direct drive electrical generators to be used in a wind power turbine, including a stator having a segmented structure. The stator segments may be arranged to cover for example an arc of 30°, 60°, 90°, 120° (or any other angle) along the circumferential direction of the stator. The stator segments are arranged circumferentially to form the stator (for example a stator may comprise six stator segments, each covering an arc of 60°). The segments can be bolted onto end-plates being large washer-like rings connecting the segments to the support structure.

The segmented has two end-coils being the first and last coils when counted from one side to the other side in the circumferential direction of the stator.

An inconvenience of such procedure is to secure mechanical support at the circumferential end of each segment. Depending on the coil design topology, the end-coils are either placed in open slots (with one tooth) or in closed slots (with two teeth).

If the end-coil slots are closed, the tooth closing the slot can have full or partial width, for example half a tooth. The greater the width of these teeth, the greater the distance between the end-coils of two circumferentially adjacent segments.

The gap between two circumferentially adjacent stator segments affects the torque harmonics. Reducing the gap reduces the amplitude. However, the mechanical and thermal performance dictates the minimum allowable gap.

SUMMARY

Therefore, there is still a need to provide a segmented stator which can improve the thermal performance and reduce the torque harmonics.

According to a first aspect of embodiments of the invention, a segmented stator for a generator, in particular for a wind turbine, comprises a plurality of teeth and slots for coil windings, wherein the teeth extend from a yoke of the stator in a radial direction of the stator. The stator comprises at least a first stator segment having a first end-surface in a circumferential direction of the stator and a second stator segment having a second end-surface in the circumferential direction of the stator, wherein the first and second end-surfaces are arranged adjacent to each other to form the stator. The first end-surface comprises first protrusions protruding the circumferential direction of the stator and first recesses therebetween, the first protrusions forming first teeth are extending from the yoke of the stator in the radial direction of the stator. The second end-surface comprises second protrusions protruding the circumferential direction of the stator and second recesses therebetween, the second protrusions forming second teeth extending from the yoke of the stator in the radial direction of the stator. The first protrusions are complementarily shaped to the second recesses and the second protrusions are complementarily shaped to the first recesses. In other words, one of the second end-surface has a negative shape of the first end-surface. The first and second protrusions are arranged in a staggered manner.

In an embodiment of the first aspect, the first and second protrusions are alternately arranged in an axial direction of the stator.

In an embodiment of the first aspect, the first and second teeth substantially have a rectangular shape as viewed in the radial direction of the stator. In modified embodiments, the first and second teeth can substantially have a triangular shape, a trapezoid shape or a rounded shape such as convex and concave shapes as viewed in the radial direction of the stator.

In an embodiment of the first aspect, the first and second teeth have a width in circumferential direction of the stator being less than or equal to a width of the other teeth of the first and second segments, alternatively or the half of the width of the other teeth of the first and second segments.

According to a second aspect of embodiments of the invention, a segmented stator for a generator, in particular for a wind turbine, comprises a plurality of teeth and slots, wherein the teeth extend from a yoke of the stator in a radial direction of the stator. Coil windings are arranged in the slots. The stator is composed of at least a first stator segment having a first end-surface in a circumferential direction of the stator and a second stator segment having a second end-surface in the circumferential direction of the stator, wherein the first and second end-surfaces are arranged adjacent to each other to form the stator. The first stator segment comprises a first end-coil winding at the first end-surface and the second stator segment comprises a second end-coil winding at the second end-surface. A strap is wound around the first and second end coil windings.

The segmented stator of the second aspect is an alternative embodiment to the segmented stator of the first aspect and basically offers the same advantages. Particularly in the second aspect, the harmful torque harmonics can be reduced so that the electrical performance is excellent.

In an embodiment of the first or second aspect, the first and second stator segments comprise at least two stacks of iron sheets which are stacked one upon the other in an axial direction of the stator, wherein spacers are arranged between the stacks of iron sheets. The spacers provide for an axial distance between the stacks of iron sheets so that an air-cooling effect of the stator can be achieved.

In an embodiment of the second aspect, the strap is wound around at least one of the spacers so that the strap is mechanically supported by the spacer.

In an embodiment of the second aspect, the stator further comprises a sheet arranged between the first and second end surfaces, wherein the strap is wound around the sheet. The sheet improves the mechanical durability of the stator. The sheet can also have the shape of a plate, which can be rigid or semi-rigid.

In an embodiment of the first or second aspect, the stator further comprises concentrated coil windings as the coil windings. In concentrated coil windings, the number of slots can be equal to the number of poles. One coil winding can be placed in each slot. An output voltage of the generator can be maximized by the concentrated coil windings.

In an embodiment of the first or second aspect, the first and second stator segments are laminated. This enables the manufacture of relative large stators. In the laminated structure, a plurality of stator segment layers is stacked one upon the other in the axial direction of the stator.

According to a third aspect of embodiments of the invention, a generator, in particular for a wind turbine, comprises a stator according to the first or second aspect and a rotor which is rotatable arranged around or inside the stator and can comprise at least one permanent magnet.

According to a fourth aspect of embodiments of the invention, a wind turbine comprises the generator, wherein the wind turbine can be a direct drive wind turbine, i.e. there is no gearbox between a hub and the generator. The segmented stators can be assembled to a relatively large stator which is usually used in such direct drive wind turbines.

According to a fifth aspect of embodiments of the invention, a stator segment is configured to be used in a stator according to the first or second aspect. The stator segment comprises an end-surface in a circumferential direction of the stator. The end-surface comprises protrusions which protrude in the circumferential direction of the stator, and recesses therebetween. The protrusions are complementarily shaped to the recesses. The protrusions form teeth extending from the yoke of the stator in the radial direction of the stator.

A sixth aspect of embodiments of the invention is directed to a method of manufacturing a segmented stator according to the first aspect. The method comprises a step of arranging the first and second end-surfaces adjacent to each other to form the stator, wherein the coil windings have been placed in the slots in advance. Thereby, the stator segments can be intermediate products so that the costs can be reduced by this manufacturing method.

BRIEF DESCRIPTION

Figure 2:
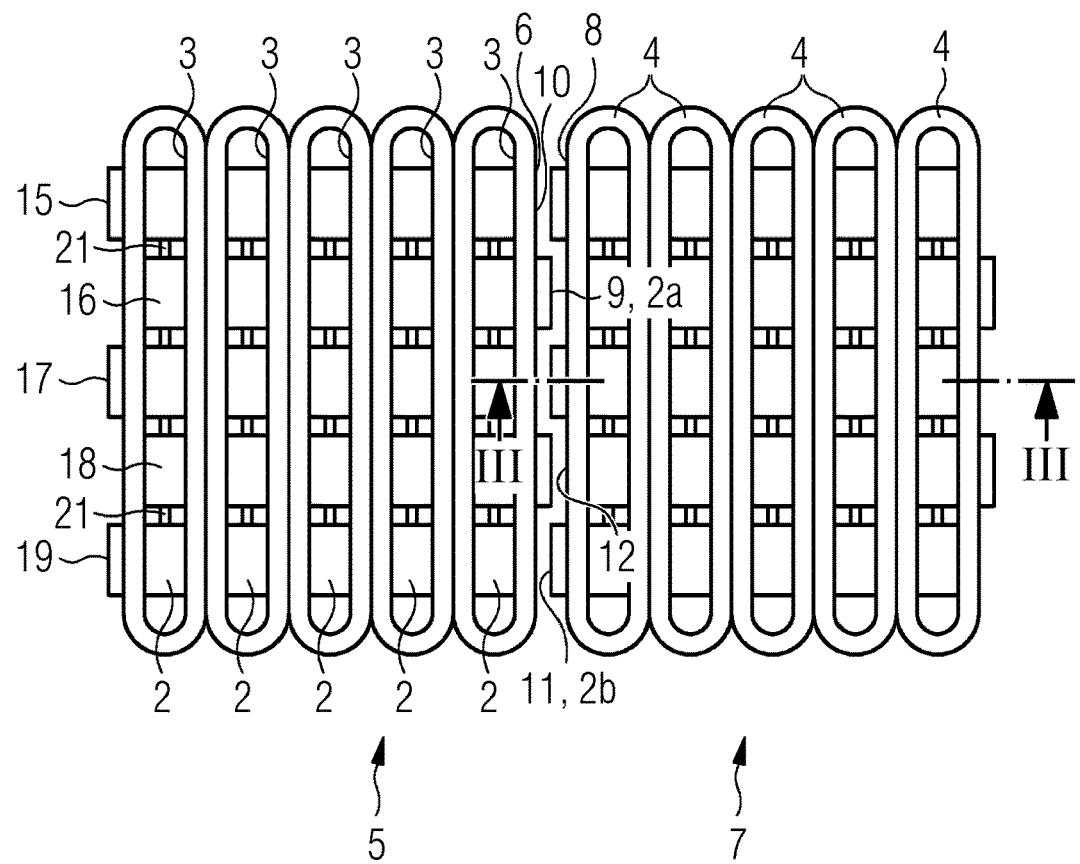
Figure 3:
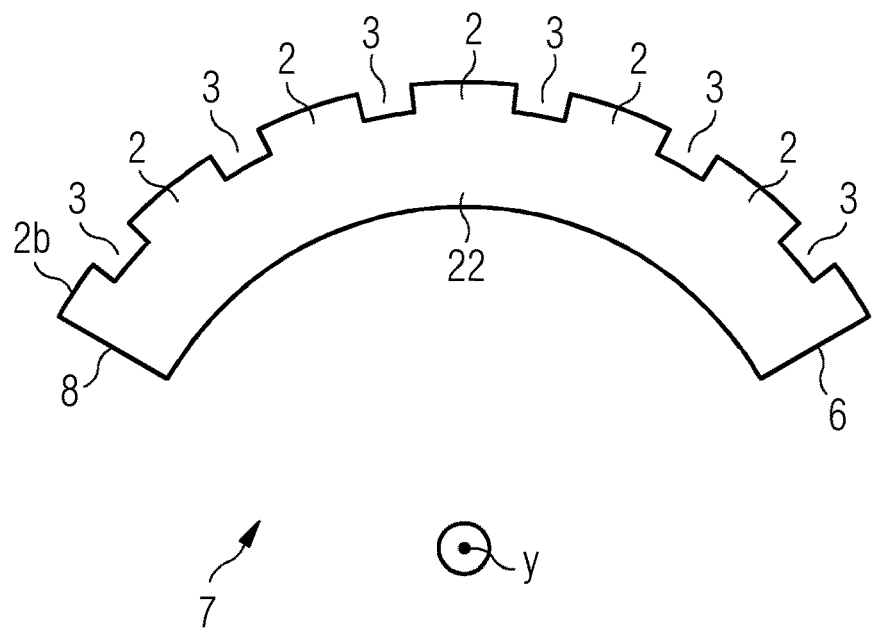
Figure 4:
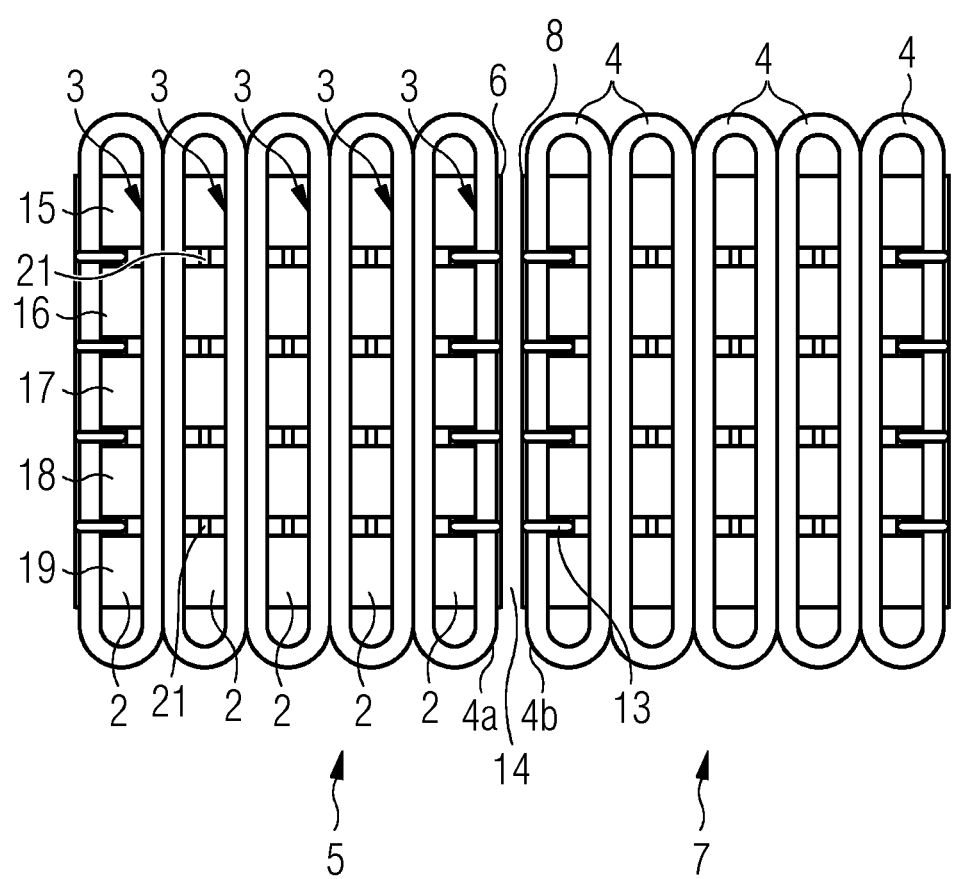

Some of the embodiments will be described in detail, with reference to the following figures, wherein like designations denote like members, wherein:

FIG. 1 shows a wind turbine;
FIG. 2 shows a schematic plan view of stator segments according to an embodiment of the invention;
FIG. 3 shows a schematic cross-sectional view along a section in FIG. 2 of a stator segment according to an embodiment of the invention; and
FIG. 4 shows a schematic plan view of stator segments according to another embodiment of the invention.

DETAILED DESCRIPTION

The illustrations in the drawings are shown schematically. It is noted that in different figures, similar or identical elements are provided with the same reference signs.

FIG. 1 shows a wind turbine 100 comprising a tower 10 which is mounted on a non-depicted fundament. A nacelle 30 is arranged on top of the tower 10.

The wind turbine 100 further comprises a hub 50 having two, three or more blades 40 (in FIG. 1, only two blades 40 are visible). The blades 40 extend radially with respect to a rotational axis Y.

The hub 50 is rotatable around the rotational longitudinal axis Y. When not differently specified, the terms axial, radial and circumferential in the following are made with reference to the rotational axis Y.

The wind turbine 100 comprises a permanent magnet electric generator 1. The hub 50 is rotationally coupled with the permanent magnet generator 1 either directly or by means of a rotatable main shaft 90. A schematically depicted bearing assembly 80 is provided in order to hold in place the main shaft 90 and the hub 50. The rotatable main shaft 90 extends along the rotational axis Y.

The permanent magnet electric generator 1 includes a stator 20 and a rotor 60. The rotor 60 is rotatable about the rotational axis Y and arranged around (or alternatively inside) the stator 20 and comprises at least one permanent magnet. An axial direction of the stator 20 is identical to the rotational axis Y.

The wind turbine 100 is a direct drive wind turbine, that means the wind turbine 100 does not comprise a gearbox between the hub 50 and the generator 1.

FIG. 2 shows a schematic plan view of stator segments 5, 7 of the segmented stator 20 according to an embodiment of the invention, and FIG. 3 shows a schematic cross sectional view along a section in FIG. 2 of a stator segment 7 according to an embodiment of the invention. The rotational axis Y is also identical to an axial direction of the stator segment 5 and to an axial direction of the stator segment 7.

The stator 20 is thus a so-called segmented stator which can be used in the generator 1, in particular for the wind turbine 100. The stator 20 comprises a plurality of teeth 2 and slots 3 for coil windings 4, wherein the teeth 2 extend from a yoke 22 of the stator 20 in a radial direction of the stator 20. The stator 20 comprises at least a first stator segment 5 having a first end-surface 6 in a circumferential direction of the stator 20 and a second stator segment 7 having a second end-surface 8 in the circumferential direction of the stator 20, wherein the first and second end-surfaces 6, 8 are arranged adjacent to each other to form the stator 20.

The first end surface 6 comprises first protrusions 9 protruding the circumferential direction of the stator 20 and first recesses 10 therebetween, and each first protrusion 9 forms a first tooth 2a extending from the yoke 22 of the stator 20 in the radial direction of the stator 20.

The second end-surface 8 comprises second protrusions 11 protruding the circumferential direction of the stator 20 and second recesses 12 therebetween, and each second protrusion 11 forms a second tooth 2b extending from the yoke 22 of the stator 20 in the radial direction of the stator 20.

The first protrusions 9 are complementarily shaped to the second recesses 12, and the second protrusions 11 are complementarily shaped to the first recesses 10. In other words, the second end-surface 8 has a negative shape of the first end-surface 6. The first and second protrusions 9, 11 are engaged with each other in a manner of complementary combs (although there is usually no mechanical contact between first and second protrusions 9, 11). The first and second protrusions 9, 11 are arranged in a staggered manner along the axial direction Y of the stator 20.

In the embodiment of FIGS. 2 and 3, the first stator segment 5 comprises two first teeth 9 and three first recesses 10, while the second stator segment 7 comprises three second teeth 11 and two second recesses 12. In general terms, the first stator segment 5 can comprise n first teeth 9 and n+1 first recesses 10, while the second stator segment 7 can comprise n+1 second teeth 11 and n second recesses 12, where n is an integer larger than one, alternatively larger than two. In a modified embodiment, the first stator segment 5 can comprise n first teeth 9 and n first recesses 10, while the second stator segment 7 can comprise n second teeth 11 and n second recesses 12, where n is an integer larger than one, alternatively larger than two.

As shown in FIG. 2, the first and second protrusions 9, 11 are alternately arranged in the axial direction Y of the stator 20, and the first and second teeth 2a, 2b substantially have a rectangular shape as viewed in the radial direction of the stator 20. In modified embodiments, the first and second teeth 2a, 2b can substantially have a triangular shape, a trapezoid shape or a rounded shape such as convex and concave shapes as viewed in the radial direction of the stator 20.

As shown in FIG. 3, the second tooth 2b (and also the first tooth 2a, although not shown in FIG. 3) has a width in the circumferential direction of the stator 20 less than or equal to a width of the other teeth 2 of the second segment 7 (and also the first segment 5), alternatively the half of the width of the other teeth 2 of the first and second segments 5, 7.

A gap between the first and second stator segments 5,7 is a design parameter (minimum clearance in the circumferential direction of the stator 20). The gap can depend on the width of the tooth 9, 11, e.g. the above-mentioned half width, and the minimum clearance between the segments 5, 7 in the circumferential direction of the stator 20.

FIG. 4 shows a schematic plan view of stator segments 5, 7 of a segmented stator 20 according to another embodiment of the invention. The segmented stator 20 can be used in the generator 1, in particular for the wind turbine 100. The stator 20 comprises a plurality of teeth 2 and slots 3, wherein the teeth 2 extend from a yoke 22 of the stator 20 in a radial direction of the stator 20. Coil windings 4 are arranged in the slots 3. The stator 20 is composed of at least a first stator segment 5 having a first end-surface 6 in a circumferential direction of the stator 20 and a second stator segment 7 having a second end-surface 8 in the circumferential direction of the stator 20, wherein the first and second end-surfaces 6, 8 are arranged adjacent to each other to form the stator 20. The first stator segment 5 comprises a first end-coil winding 4a at the first end-surface 6 and the second stator segment 7 comprises a second end-coil winding 4b at the second end-surface 8. Contrary to the embodiment of FIGS. 2 and 3, there are no half-teeth but slots at the first and second end-surfaces 6, 8 of the first and second stator segments 5, 7. A strap 13 is wound around the first and second end-coil windings 4a, 4b to hold the first and second end-coil windings 4a, 4b in place.

A sheet 14 arranged between the first and second end-surfaces 6, 8, wherein the strap 13 is wound around the sheet 14 and a spacer 21 keeping the stacks of iron sheets 15, 16, 17, 18, 19 apart. A distance between the first and second stator segments 5, 7 is determined by a thickness of the sheet 14. The sheet 14 improves the mechanical durability of the stator 20. The sheet 14 can also have the shape of a plate, which can be rigid or semi-rigid.

In the embodiments of FIGS. 1 to 4, the first and second stator segments 5, 7 comprise at least two stacks of iron sheets 15, 16, 17, 18, 19 stacked one upon the other in the axial direction Y of the stator 20 (a so called laminated stator segment formed by iron sheets as stator segment layers), wherein spacers 21 can be arranged between the stacks of iron sheets 15, 16, 17, 18, 19. The spacers 21 provide for an axial gap between adjacent stacks of iron sheets 15, 16, 17, 18, 19 resulting in radially arranged ducts for air cooling of the stator 20.

In the embodiment of FIGS. 2 and 3, the first stator segment 5 comprises first stacks 15, 17, 19 which have a length in a circumferential direction of the stator 20 such that the first recesses 10 are formed. The first stator segment 5 further comprises second stacks 16, 18 which have a length in a circumferential direction of the stator 20 such that the first protrusions 9 are formed. In other words, each axial gap is defined between a first stack 15, 17, 19, which defines one of the first recesses 10, and a second stack 16, 18, which defines one of the first protrusions 9.

In the embodiment of FIG. 4, the strap 13 is wound around at least one of the spacers 21 so that the strap 13 is supported by the spacer.

In the embodiments of FIGS. 1 to 4, the coil windings 4 can be concentrated coil windings (fractional slot design topology).

In the embodiments of FIGS. 1 to 4, the stacks of iron sheets 15, 16, 17, 18, 19 are not necessarily of equal axial length. Furthermore, the spacers 21 can be omitted.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A segmented stator for a generator, the stator comprising:
   a plurality of teeth and slots for coil windings, wherein the teeth extend from a yoke of the stator in a radial direction of the stator; wherein
   the stator comprises at least a first stator segment having a first end-surface in a circumferential direction of the stator and a second stator segment having a second end-surface in the circumferential direction of the stator, wherein the first and second end-surfaces are arranged adjacent to each other to form the stator;
   the first end-surface comprises first protrusions protruding the circumferential direction of the stator and first recesses therebetween, the first protrusions forming first teeth extending from the yoke of the stator in the radial direction of the stator;
   the second end-surface comprises second protrusions protruding the circumferential direction of the stator and second recesses therebetween, the second protrusions forming second teeth extending from the yoke of the stator in the radial direction of the stator;

the first protrusions are complementarily shaped to the second recesses and the second protrusions are complementarily shaped to the first recesses;

a clearance is provided between the first stator segment and the second stator segment so that there is no mechanical contact between the first protrusions and the second protrusions; and the first and second protrusions are alternately arranged in an axial direction of the stator.

2. The stator according to claim 1, wherein the first and second teeth substantially have a rectangular shape as viewed in the radial direction of the stator.

3. The stator according to claim 1, wherein the first and second teeth have a width in circumferential direction of the stator less than or equal to a width of the other teeth of the first and second segments, or the half of the width of the other teeth of the first and second segments.

4. A method of manufacturing a segmented stator according to claim 1, comprising a step of:

arranging the first and second end-surfaces adjacent to each other to form the stator, wherein the coil windings have been placed in the slots in advance.

5. A wind turbine comprising the segmented stator according to claim 1.

6. A stator segment for a stator, the stator segment comprising:

an end-surface in a circumferential direction of the stator;

wherein the end-surface comprises protrusions protruding the circumferential direction of the stator and recesses therebetween, the protrusions forming teeth extending from a yoke of the stator in a radial direction of the stator;

the protrusions are complementarily shaped to the recesses; and the stator segment is configured such that a clearance is provided between the stator segment and a further stator segment of the stator so that there is no mechanical contact between the stator segment's protrusions and protrusions of the further stator segment.

\* \* \* \* \*